United States Patent [19]

Kirouac et al.

[11] Patent Number: 5,155,847
[45] Date of Patent: Oct. 13, 1992

[54] METHOD AND APPARATUS FOR UPDATING SOFTWARE AT REMOTE LOCATIONS

[75] Inventors: Donald L. Kirouac, Thornhill; William A. Porrett, Unionville; Marek J. Czerwinski, Scarborough, all of Canada

[73] Assignee: Minicom Data Corporation, Markham, Canada

[21] Appl. No.: 227,799

[22] Filed: Aug. 3, 1988

[51] Int. Cl.[5] .................... G06F 7/00; G06F 9/00; G06F 13/00
[52] U.S. Cl. .................... 395/600; 395/650; 395/200; 364/DIG. 1; 364/DIG. 2
[58] Field of Search ............... 364/300, 200 MS File, 364/900 MS File; 395/600, 650, 200

[56] References Cited

U.S. PATENT DOCUMENTS

| | | | |
|---|---|---|---|
| 4,558,413 | 12/1985 | Schmidt et al. | 364/300 |
| 4,630,234 | 12/1986 | Holly | 364/900 |
| 4,641,274 | 2/1987 | Swank | 364/900 |
| 4,714,996 | 12/1987 | Gladney et al. | 364/300 |
| 4,748,561 | 5/1988 | Brown | 364/300 |
| 4,794,519 | 12/1988 | Koizumi et al. | 364/200 |
| 4,827,399 | 5/1989 | Shibayama | 364/200 |
| 4,845,665 | 7/1989 | Heath et al. | 364/900 |
| 4,849,879 | 7/1989 | Chinnaswamy et al. | 364/200 |
| 4,858,114 | 8/1989 | Heath et al. | 364/200 |
| 4,866,611 | 9/1989 | Cree et al. | 364/900 |
| 5,019,963 | 5/1991 | Alderson et al. | 364/200 |

*Primary Examiner*—Stuart N. Hecker
*Assistant Examiner*—Michael A. Whitfield
*Attorney, Agent, or Firm*—Nixon & Vanderhye

[57] ABSTRACT

A method and system are provided for updating the software used in remote computer systems from a central computer system. The method includes storing in the central computer system, copies of the software executable used in each remote computer system. When the copies of the software in the central computer system are upgraded, for example, to correct the software, to add new facilities, to change user interfaces, to make cosmetic changes, to improve performance, etc., each change made to the software is monitored and stored. The remote computer systems are permitted access to the central computer system via communication links and the software in the remote computer systems and the corresponding software in the central computer system are compared. All of the changes that have been made to the software at the central computer system which have not been made to the corresponding software at the remote computer system accessing the central computer are detected. The detected changes are then transmitted to the remote computer system and applied to the software therein in order to upgrade the software in the remote computer system. The upgraded software in the remote computer system is examined to ensure that the software has been changed correctly. The method allows the software at the remote computer systems to be upgraded even while the software at the remote site is being used. The system and method also allow the software used in the remote computer systems to be upgraded when the remote computer systems use different versions of the software and allow the software to be upgraded in a variety of hardware environments and operating systems.

32 Claims, 7 Drawing Sheets

METHOD AND APPARATUS FOR UPDATING SOFTWARE AT REMOTE LOCATIONS

BACKGROUND OF THE INVENTION

The present invention relates to software support and in particular to a method and system for upgrading software used in remote computer systems from a central computer system.

Presently, a plurality of methods are used by software suppliers to upgrade the existing software that is used by their customers. These methods include floppy disk distribution, tape distribution and modem support. For example, Lotus Development Corporation typically uses floppy disk distribution to supply its users with Lotus 1-2-3 (trademark) software. This method requires Lotus Development Corp. to write the upgraded versions of their software on floppy disks and distribute the disks via an appropriate service to all of its customers.

However, a number of problems exist in this type of software support method in that an upgraded floppy disk version of the software is typically released once a year. Thus, a user must use the existing software even after faults have been recognized, until the new disk version of the software is received, since there is no immediate software support for individual users. Furthermore, since the upgrading process often results in the addition of new program errors, the user must cope with the program faults of the new version until yet another version of the software is released. Moreover, further time delays exist in obtaining upgraded versions of the software, since the floppy disks are typically distributed via the postal service.

A similar manner of software support has been attempted using tape distribution to supply new versions of software to consumers. Although this method reduces the occurrence of damage to the physical medium containing the software, the process is still time consuming, since the tapes must be forwarded to each of the software users.

Modem support has also been attempted as a method of upgrading existing software. In this method, an operator at the software supplier links with the consumer's remote computer system and manually upgrades the software. However, this method of upgrading software is time consuming, expensive and prone to error, since the method involves manual processes. Accordingly, there is a need for an improved method of upgrading software.

SUMMARY OF THE INVENTION

It is therefore an object of the present invention to obviate or mitigate the above disadvantages.

According to the present invention there is provided a method of upgrading software used in remote computer systems from a central computer system comprising the steps of:

storing in said central computer system, software corresponding to the software used in each of said remote computer systems;

upgrading the corresponding software at said central computer system;

recording the changes made to said corresponding software;

allowing access of said remote computer systems to said central computer system via communication links;

identifying said remote computer systems accessing said central computer system and the software used therein;

comparing the software in said remote computer system with the corresponding software in said central computer system;

identifying changes that have been made to the corresponding software that have not been made to the software in said remote computer systems;

transmitting the identified changes to said remote computer system and applying the changes to the software therein; and verifying transmission of the changes and examining the upgraded software in said remote computer systems to ensure that the software has been properly upgraded.

In another aspect of the present invention there is provided a software support system for upgrading software used in remote computer systems from a central computer system comprising:

a central computer system including data storage for storing software corresponding to the software used in said remote computer systems;

input terminals at the central computer system through which the corresponding software may be upgraded, with the changes made for the upgrade being recorded by the central computer system;

communication links allowing the remote computer system to access the central computer system;

a comparator for comparing the software at a remote computer system with the corresponding software at the central computer system and identifying the changes made to the corresponding software which have not been made to the software at the remote computer system;

a data transmission device to transmit the identified changes to the remote computer system and to apply the changes to the software therein to upgrade the software, the central computer system and the remote computer system verifying the correct transmission of the changes and proper upgrading of the software in the remote computer system.

Preferably, at least one conventional computer terminal is provided for allowing a user to apply changes to the corresponding software stored in the central computer system. It is also preferred that the data transmission device implement "handshaking" between the central computer system and each remote computer system accessing the central computer system.

Preferably, the central and remote computer systems implement checksums to verify the correct transmission of the software changes sent to the remote computer systems and to ensure that the software at the remote computer systems has been properly upgraded.

Preferably, the central computer system is capable of upgrading the software used in the remote computer systems at any time and has multi-tasking capabilities to allow a plurality of remote computer systems to gain access to the central computer system at the same time. Furthermore, it is preferred that the system provides software support for all remote computer systems when the remote computer systems are using different versions of the software.

The present system and method provide the advantages of allowing the software used in the remote computer systems to be upgraded from a central system at any time regardless of the magnitude of the upgrade. Furthermore, the system can operate on various software and hardware environments thereby allowing substantially all types of software to be upgraded. As used herein, executable code comprises data which represents the program of a computer system and the associated data for such a program.

BRIEF DESCRIPTION OF THE DRAWINGS

An embodiment of the present invention will now be described, by way of example only, with reference to the accompanying drawings in which:

FIG. 3a is a portion of a flow chart illustrating the operation of the portion illustrated in FIG. 2a;

FIG. 3b is another portion of a flow chart illustrating the operation of the portion illustrated in FIG. 2a.

DESCRIPTION OF THE PREFERRED EMBODIMENTS

Figure 1:
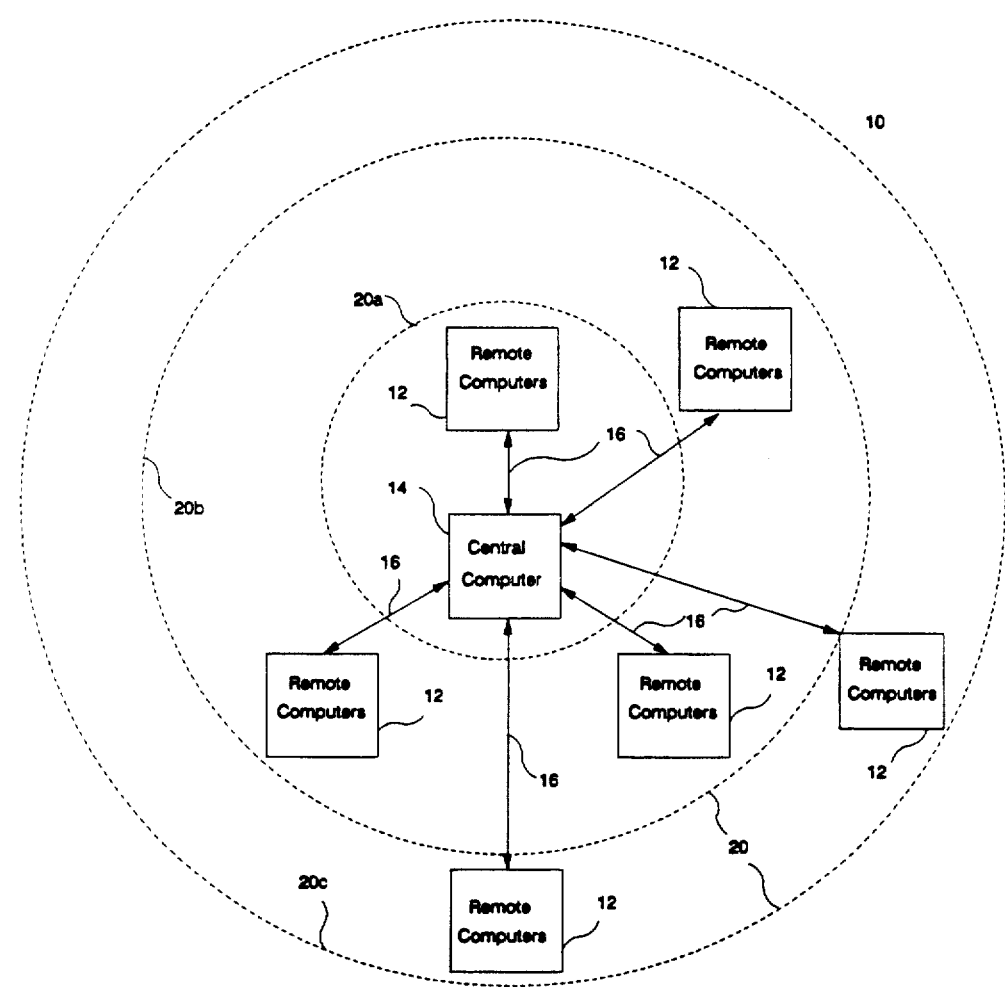
FIG. 1 is a schematic diagram of a software support system.

Referring to FIG. 1, a software support system 10 is shown for upgrading software used in remote computer systems 12 from a central computer system 14. The central computer system 14 stores software corresponding to the software used in each of the remote systems 12 and permits the corresponding software to be upgraded. The central computer system 14 is connected to the remote computer systems 12 via communication links 16, the links typically being a packet switching network to allow the changes that have been made to the corresponding software to be transmitted from the central computer system 14 to the remote computer systems 12.

The remote computer systems 12 are divided into groups as schematically represented by concentric circles 20. Each group of remote computer systems 12 is assigned a group threshold which determines the relative time that the remote systems of one group must wait to receive the changes that have been made to the software used at remote systems of a different group. For example, the remote computer systems 12 of one group, those positioned between the pair of concentric circles 20a and 20b are assigned a different group distribution number than the other group of remote computer systems positioned between concentric circles 20b and 20c thus, may receive upgrades to the software used therein prior to the remote computer systems in the other group. This feature permits staged release of the software upgrades and allows the operation of the upgraded software to be monitored on a select group of remote computer systems 12 prior to global release of the software upgrades to all of the remote computer systems 12.

Figure 2A:
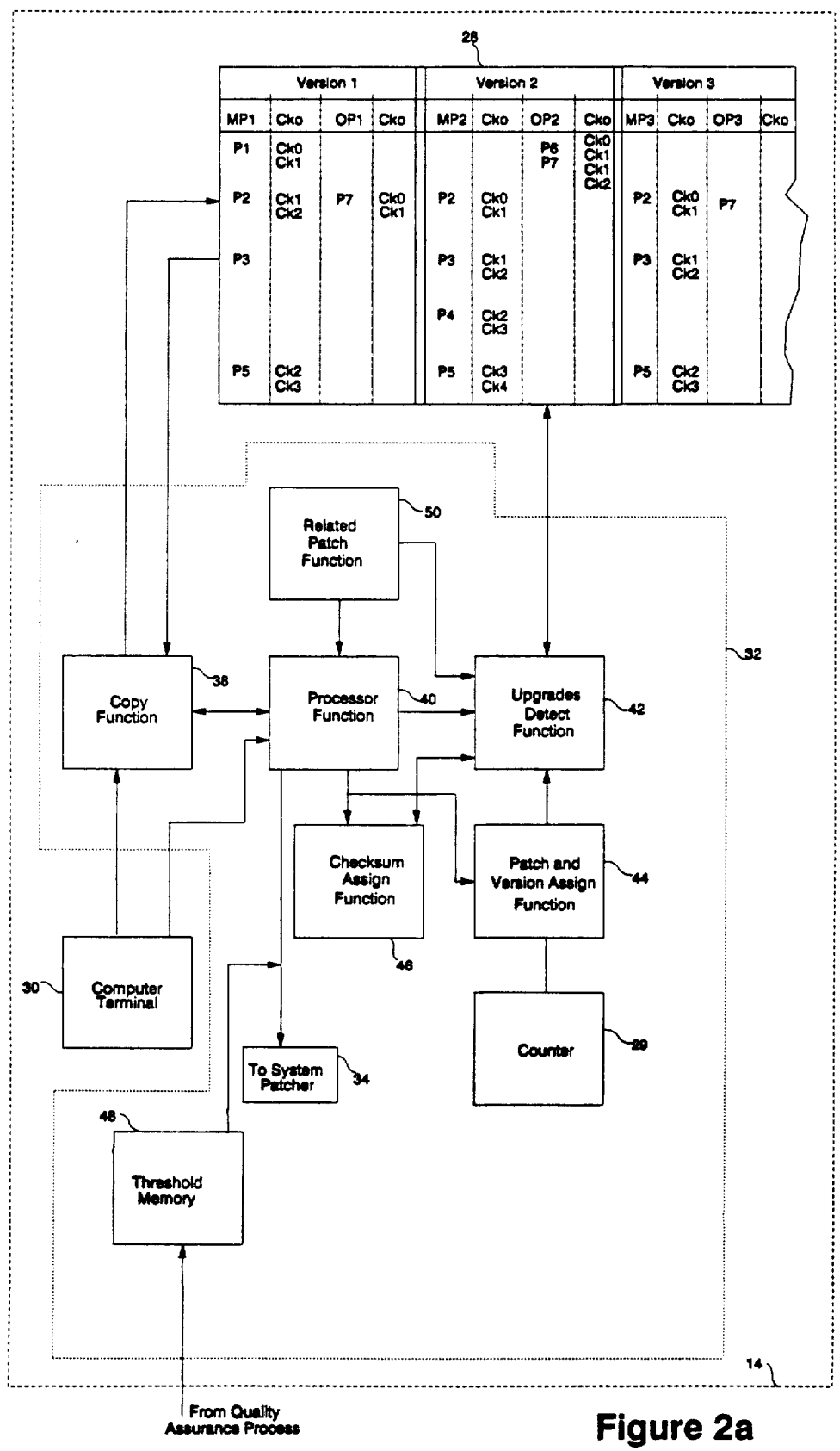
FIG. 2a is a schematic diagram of a portion of the system illustrated in FIG. 1.
Figure 2B:
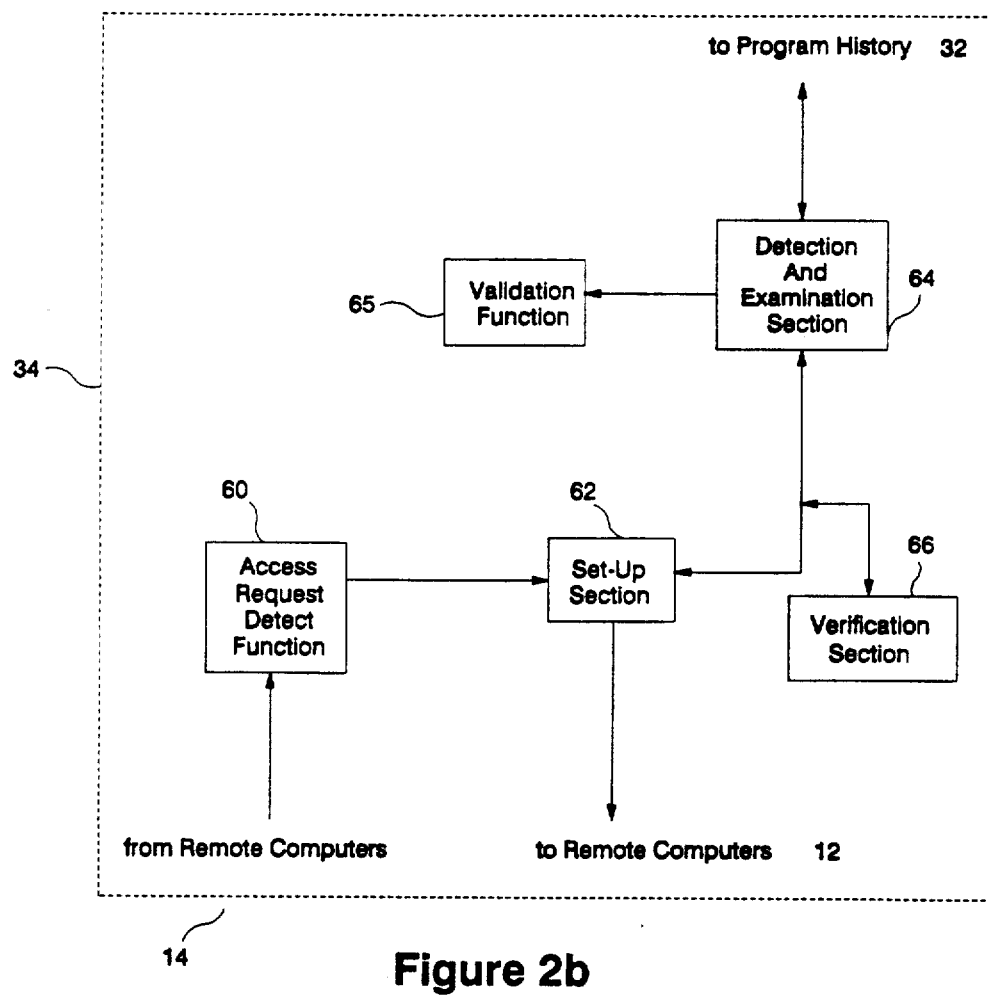
FIG. 2b is a schematic diagram of another portion of the system illustrated in FIG. 1.

Referring now to FIGS. 2a and 2b, the central computer system 14 which is typically located at the headquarters of the software supplier is shown. The central computer system 14 includes a large data store 28 for storing copies of the software corresponding to the software used in each of the remote computer systems 12. The software supplier provides to the remote computer systems, mandatory programs $MP_x$ ("x" denoting the version number of the program) which are used in all of the remote computer systems. The supplier also makes available to the remote computer systems 12, optional programs $OP_{xy}$ ("x" denoting the version number of the program and "y" denoting the number of the optional program since a variety of optional programs are available) which are used in some of the remote computer systems 12 to perform additional functions particular to the business of the user.

Initially, the software supplier distributes via tape distribution, the first version of the mandatory programs $MP_1$ to all of its purchasers who use the software in their remote computer systems 12 for daily business operations. Some of the customers are also supplied with the first version of one or more optional programs $OP_{1y}$. Whenever a remote computer system 12 is receiving the mandatory programs $MP_x$ and optional programs $OP_{xy}$, the mandatory programs and the optional programs are distributed in a package and are the same version "x" of software.

After the remote computer systems 12 have been supplied with the first version of available software, the software supplier often desires to upgrade the software to add user facilities, to make cosmetic changes, to change user interfaces, to correct errors, to improve performance, etc. Since a copy of the first version of the mandatory programs $MP_1$ and all of the available optional programs $OP_{1y}$ are maintained in the data store 28, changes or patches P can easily be made to the software via the central computer system 14. As patches P are made to either the mandatory programs $MP_1$ or to any of the optional programs $OP_{1y}$, the central computer system 14 monitors and records the changes made to the software and of course, changes the software in the remote computer systems 12, if the changes are applicable, the details of which will be described herein.

However, after a plurality of changes have been made to a version of the software stored in the data store 28, it is uneconomical to supply a new purchaser of the software with an unaltered version of the mandatory programs $MP_x$ and optional programs $OP_{xy}$ and afterwards transmit to the purchaser, all of the changes that have been made to the programs. Accordingly, after a number of changes have been made to the original mandatory and optional programs, another version of the mandatory and optional programs is released to new purchasers of the software via tape distribution, the second version of the programs including some or all of the changes and any additions that have been made to the first version of the programs, so that the new purchasers are initially supplied with an up-to-date version of the available programs. When the second version of the software is released, a copy of the mandatory programs $MP_2$ and optional programs $OP_{2y}$ are stored in the data store 28 so that upgrades can be made to the second version of software. This process is performed for each new version of the mandatory and optional programs that is released by the supplier for use by its customers. This allows the system 14 to upgrade the software used in all of the remote computer systems 12, even if the computer systems 12 operate using different versions of the software.

The central computer system 14 includes at least one computer terminal 30 comprising a conventional keyboard and video display terminal for allowing a user to access the various versions of the mandatory and optional programs $MP_x$ and $OP_{xy}$ held in the data store 28. Each time a user accesses the data store 28 to upgrade one or more of the mandatory or optional programs stored therein, all of the changes made to a program during that session are categorized as a patch $P_N(V=i$ to z), wherein "N" is the number of the patch and "V" is equal to the numbers of the all of the versions of the same program to which that the patch is applicable and to which it is to be applied. The patch number "N" is determined by the value of a counter 29, the counter incrementing upon the creation of each patch made to any program. Thus, the first patch P made to any program regardless of its version will be assigned patch number 1 (N=1), the second patch made to any program will be assigned patch number 2 (N=2), etc.

The control software used in the central computer system 14 for allowing the programs in the data store 28 and in the remote computer systems to be upgraded is partitioned mainly into two major sections, namely a program history section 32 and a system patcher section 34.

The program history section 32 functions to monitor and record all of the upgrades or patches P that have been made to the various versions of any of the programs held in the data store 28. The system patcher section 34 functions to ensure that the appropriate changes made to the software in central computer system 14 are transmitted to the correct remote computer systems 12 and applied to the corresponding software therein. The system patcher section S4 also ensures that the software in the remote computer systems 12 is the same as the upgraded version stored in the central computer system 14, once the changes have been applied to the software.

The program history section 32 includes a copy function 38 which is associated with the data store 28. The function 38 copies the version of the program stored in the data store 28 that the user of the terminal 30 wishes to upgrade. A processor function 40 receives the copied program and allows the user to make the desired changes thereto. When the user has completed making all of the changes, an upgrade detect function 42 monitors and records all of the changes made to the program during that session by comparing the upgraded program with the program copied by the function 38. The changes detected by the function 42 are then grouped as a patch P. A patch and version assign function 44 communicates with the processor function 40, the upgrade detect function 42 and the counter 29 and assigns the patch P, its patch number "N" and the version numbers "V" of the same program to which the patch P applies.

For example, if a patch P is made to the first version of one of the mandatory programs $MP_1$ and there are six different versions of the mandatory programs $MP_1$ to $MP_6$ that have been released by the vendor that are used in the remote computer systems 12, the value of the counter 29 is examined and its value is assigned to the patch P as its patch number N. As mentioned previously, the value of the counter 29 indicates the total number of patches that have been made to the programs in the data store 28. Thus, if a total of six patches have been previously made, the above-mentioned patch P made to the first version of the one mandatory program will be assigned patch number 7 (N=7).

Thereafter, the other versions of the mandatory programs $MP_2$ to $MP_6$ are examined to detect if the patch $P_7$ made to the program $MP_1$ is applicable to those versions of the same program. The version numbers of all of the programs to which the patch is applicable are displayed on the terminal 30 and the user is requested to confirm whether the patch $P_7$ should be applied to the other applicable programs as well. If the patch $P_7$ is to be applied to the other detected versions of the same program, the patch number "N" is maintained and the patch is automatically applied and stored in the data store 28 under all of the versions of the mandatory program to which it applies.

A checksum assign function 46 also communicates with the processor function 40 and with the upgrade detect function 42 and assigns every patch made to a program a pair of checksums $Ck_N$ and $Ck_{N+1}$. The checksums $Ck_N$ and $Ck_{N+1}$ represent an image of the program to which the patch is being applied before the patch is applied to the program and an image of the program after the patch has been applied to the program.

A related patch detect function 50 is also provided for detecting when the user making the changes to the software, codes a patch as being related to a previous patch made to the same program or codes the patch as being related to a patch made to another program in the same version of programs. When the related patch detect function 50 detects related patches, the related patches are coded. After the patch has been assigned a patch number, examined to determine the other versions of the same program to which it applies, assigned the checksums, and has been examined for any relationship with other patches, the patch, the assigned patch number, the checksums and any assigned codes are stored in the data store 28 for the various versions of the program that were upgraded.

As should be realized, the same processes apply whether changes are made to a mandatory program or to an optional program. For example, if a patch $P_N$ is made to the optional program $OP_{11}$ and there are six released versions of the software, the patch $P_N$ will be assigned the next available patch number "N" as determined by the value of the counter 29. Similarly, the other versions $OP_{21}$ to $OP_{61}$ of the optional program $OP_{11}$ will be examined to determine if the patch $P_N$ is applicable thereto. The process of detecting related patches is also performed for patches made to the optional programs.

The program history section 32 also includes a patch threshold valve memory 48 for storing a predetermined patch threshold value which is equal to the highest patch number with no untested patches below it. The patch threshold value determines the patches that can be transmitted to the remote computer systems 12 and is used to determine the value of the group thresholds. The patch threshold value is determined by a quality assurance process used by the software vendor for monitoring the operation of each patch to attempt to ensure that the patches operate with the programs without error or without introducing errors. For example, if the threshold value is set at 10, only patches $P_1$ to $P_{10}$ can be transmitted to the remote computer systems 12, since those patches will have been tested by the quality assurance process and will have been determined to operate satisfactorily. Other patches that have been created yet have not passed through the quality assurance process which have a patch number greater than the threshold value may be transmitted to specific remote systems 12, if special provisions have been made for the systems, the details of which are described herein but typically will be maintained in the data store 28 until the patch threshold value has been raised.

Figure 3A:
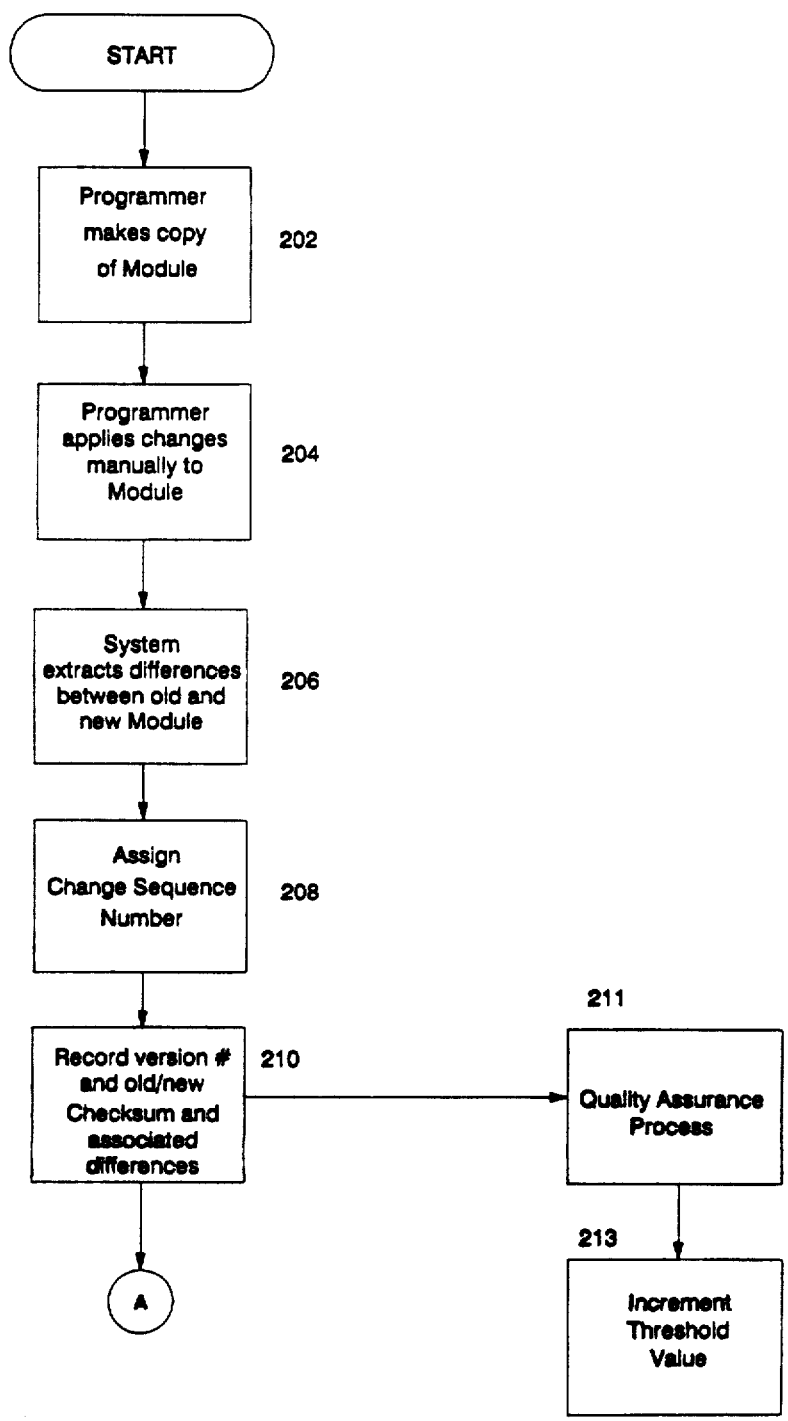
Figure 3B:
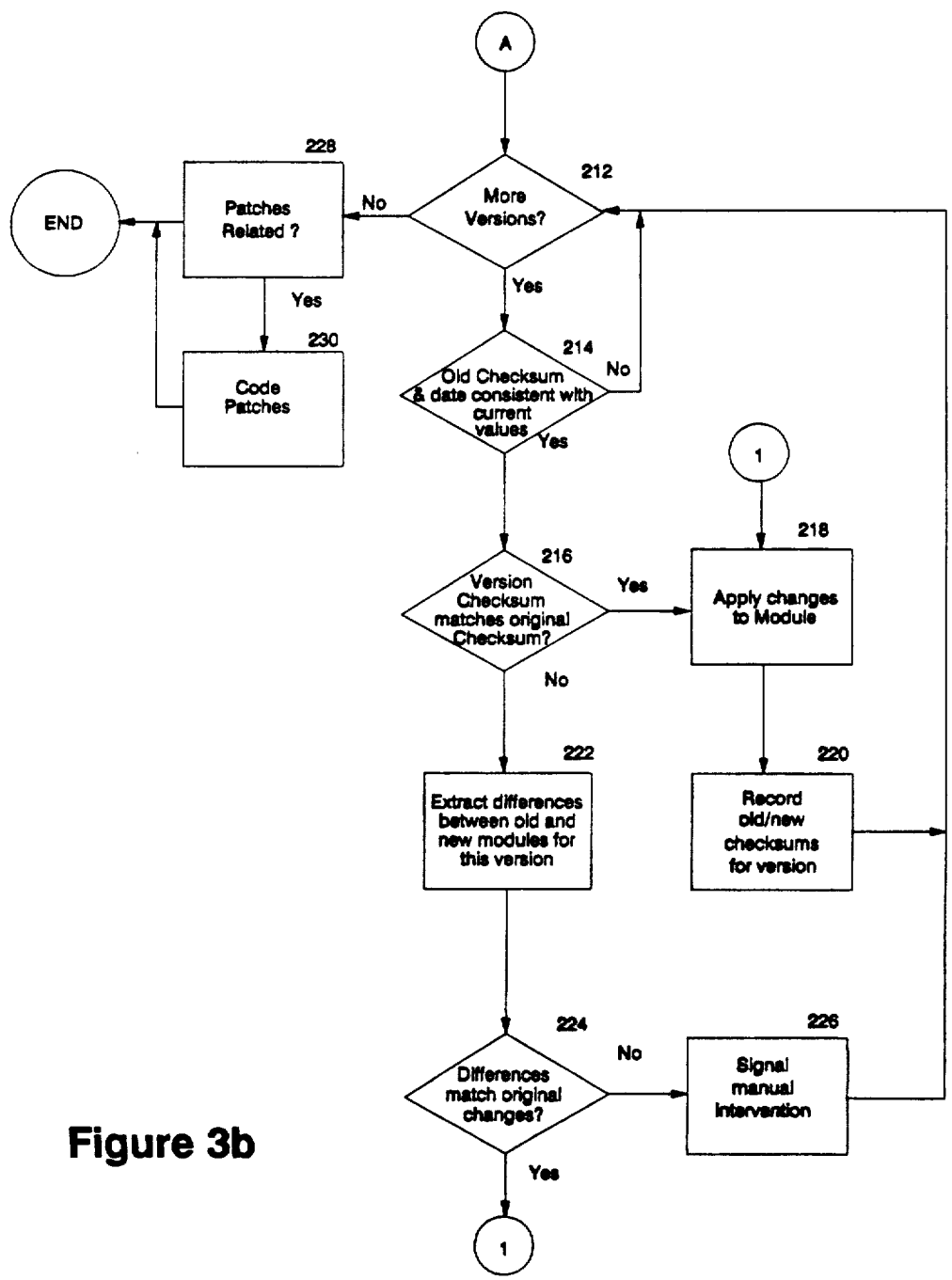

Referring to FIGS. 3a and 3b the operation of the program history section 32 will now be described. Initially as mentioned previously, when the different versions of the mandatory programs $MP_1$ to $MP_N$ and associated optional programs $OP_{1y}$ to $OP_{Ny}$ are supplied to the remote computers systems 12, copies of the programs are stored in the data store 28 of the central computer system 14. As this is done, the checksum assign function 46 assigns each program a checksum $Ck_o$ representing an image of the original program which is also stored in the data store 28.

If, for example, it is desired to upgrade one of the mandatory programs $MP_1$, the user accesses the central computer system 14 via the terminal 30. As should be realized, the user must meet certain access requirements such as typing in appropriate passwords to prevent the occurrence of unauthorized access to the programs. After access has been accomplished, the user chooses the program that is to be changed in this case, one of the mandatory programs $MP_1$. The copy function 38 in turn creates a copy of the one program $MP_1$ having all of the previous patches P that have been made to the program applied thereto as indicated at block 202. The checksum assign function 46 examines the copied program and recalculates a checksum $Ck_N$ for the copied program which represents an image of the program. The checksum $CK_N$ is compared with the second checksum assigned to the last patch made to the same program to ensure that the copied program has in fact been copied correctly.

The correctly copied program is then conveyed to the processor function 40 and the user is able to edit the program in any manner that is desired in order to upgrade the software as indicated at block 204. After the desired changes have been made to the program, the update detect function 42 compares the changed copy of the program with the copied program $MP_1$ as indicated at block 206 to detect any differences. All of the differences detected between the programs are grouped as a patch P. The code assign function 44 examines the counter 29 and in turn assigns the patch P, a patch number N, this number being one greater than the number of the counter 29 and the counter 29 is incremented as indicated at block 208. When the patch P has been assigned its patch number N, the checksum assign function 46 assigns the patch, a second checksum $Ck_{N+1}$ as indicated at block 210, the second checksum representing an image of the program with the patch applied to it.

When the user wishes to make further changes to the same program or to another program, access can be gained to the central computer system 14 in the same manner described above. For example, after another patch $P_{N+1}$ has been made to the same program in the above-mentioned manner, the checksum assign function 46 will recalculate the first checksum $CK_{N+1}$ for the next patch $P_{N+1}$ and will assign the patch $P_{N+1}$, a second checksum $Ck_{N+2}$. As should be noted, each successive patch P made to a program is assigned a checksum that is also assigned to the previous patch. The above described process is performed regardless of which version of the mandatory programs or optional programs is being updated.

After the checksums have been assigned to the patch, the patch P is stored in the data store 28 along with the assigned patch number and the assigned checksums as also indicated at block 210. The patch P is also forwarded to the quality assurance process as shown by block 201 wherein it is given a number and is placed on a list including other patches made to any of the programs that have not been tested by the quality assurance process. The list of patches may be placed in the order of patch number or may be in any order depending on how quickly the patch needs to be processed and released to specific remote systems 12, the process of which will be described. When a patch reaches the top of the list, the quality assurance process tests the program with the patch applied to it to ensure that the patched program operates satisfactorily. After the patch has been tested by the quality assurance process and determined to operate satisfactorily, if the tested patch has a patch number one greater than the patch threshold value, the threshold value is incremented by one so that the processed patch will be available to the remote computer systems.

If the processed patch has a patch number two or more greater than the patch threshold value, then the threshold value is not incremented and the tested patch is not released to the remote computer systems 12 until all of the patches having patch numbers between the patch threshold value and the patch number of the tested patch have also been tested, unless special provisions are made, the details of which will be described herein.

Once a patch P has been made to a program and has been recorded in the data store 28, the patch is examined to determine if it is applicable to different versions of the same program as indicated at blocks 212 and 214. When the patch P is detected as being applicable to other versions of the same program, the user creating the patch P is prompted to confirm whether the patch P should be applied to the applicable versions of the same program. If it is desired to apply the patch to the other versions of the program, the first checksum of the patch P is examined and compared with the second checksum of the last patch made to the applicable versions to determine if the checksums are identical as indicated at block 216. If the first checksum of the patch P is the same as the second checksum assigned to the last patch made to the applicable versions, the patch P is automatically applied to the applicable versions of the same program along with the patch number N and the appropriate checksums and stored in the data store 28 as indicated at blocks 218 and 220.

However, if the first checksum assigned to the patch P applied to the first version and the second checksum of the last patch applied to an applicable version of the same program are not identical, the patch is applied to a copy of the applicable version of the program and the differences between the patched copy of the applicable version and the patched first version are determined. In addition, the differences between the unpatched first version and the unpatched applicable version are determined. The two sets of differences are compared and if equivalent, the patch is applied to the applicable version.

If the resulting differences between the programs are not equivalent to the patch that is being applied to the applicable version of the same program, then manual intervention must be used if the patch P is to be applied to the program as indicated at block 226. The patch may be entered to the applicable version under the same patch number or as a new patch having a new patch number.

Once the patch has been made to all of the applicable versions of the same program, the user is prompted to indicate whether the patch $P_N$ is related to any of the previous patches $P_{N-1}$ made to the same program or if the patch $P_N$ is related to another program in the same version of programs. If the patch $P_N$ is related to another patch $P_{N-1}$, the patches $P_N$ made to each version of the program are coded if the version of the program includes the patch $P_{N-1}$ or the other program respectively as indicated at blocks 228 and 230.

Thus, in an overview, the data store 28 and program history section 32 in effect maintain a copy of each version of the mandatory and optional program released and used in the remote computer systems 12 along with a list of all of the changes made to any of the programs.

The system patcher section 34 controls the access of the remote systems 12 to the central system 14. The system patcher 34 includes an access request detect function 60 for detecting if any of the remote computer systems 12 are requesting access to the central computer system 14. A connection and set-up function 62 communicates with the access detect function 60 and performs the necessary identification checks and initiates the proper "handshaking" requirements with the remote computer system 12 when a valid remote computer system 12 has requested access to the central computer system 14. The connection and set-up function 62 includes multi-tasking software to allow a plurality of remote computer systems to access the central computer system 14 at the same time. A detection and examination function 64 detects the version number of the programs used by the remote computer system and all of the optional programs used by the requesting remote computer system 12 along with the patch number of the last patch that the remote computer system 12 has received.

The detection and examination function 64 also communicates with a remote computer system validation function 65 and the program history section 32 so that the proper patches are transmitted to the requesting remote computer system 12. The validation function 65 includes a client data base holding information on each remote computer system registered in the central computer system 10. The function 64 stores the type of software (ie. optional programs) that each remote computer system 12 uses, the version number of the software used at each remote system 12, the patch number of the last patch successfully transmitted and applied to the software in the remote computer systems 12, the group that the remote computer systems 12 belong, any priority patches assigned to a specific remote computer system 12 or to a group of remote computer systems, any access priority assigned to a remote computer system 12 and the date and time of the last communication link established between a remote computer system and the central computer system. The date and time are stored to allow delinquency reports to be generated if a remote computer system does not request update information for extended periods of time. Lastly, a verification function 66 is provided to ensure that all transmitted patches sent to the remote computer systems 12 are properly received and to ensure that once the patches have been applied to the programs used in the remote computer systems 12, the resulting programs are equivalent to the corresponding upgraded version of the program stored in the data store 28.

Typically, when it is desired to apply changes to a remote system 12, the number of patches applied to the remote system is determined by the patch threshold value. However, as mentioned previously, special provisions exist which enable a remote system to receive patches which exceed the threshold value assigned to the group that the remote system belongs.

To facilitate this, a group of remote systems or a specific remote system in a group may be assigned priority patches. The priority patches allow a remote system or a group of remote systems to receive a patch, any related patches that are related to the priority patch and any patch made to the same program having a patch number below the threshold value that the remote system 12 has not yet received.

Figure 4A:
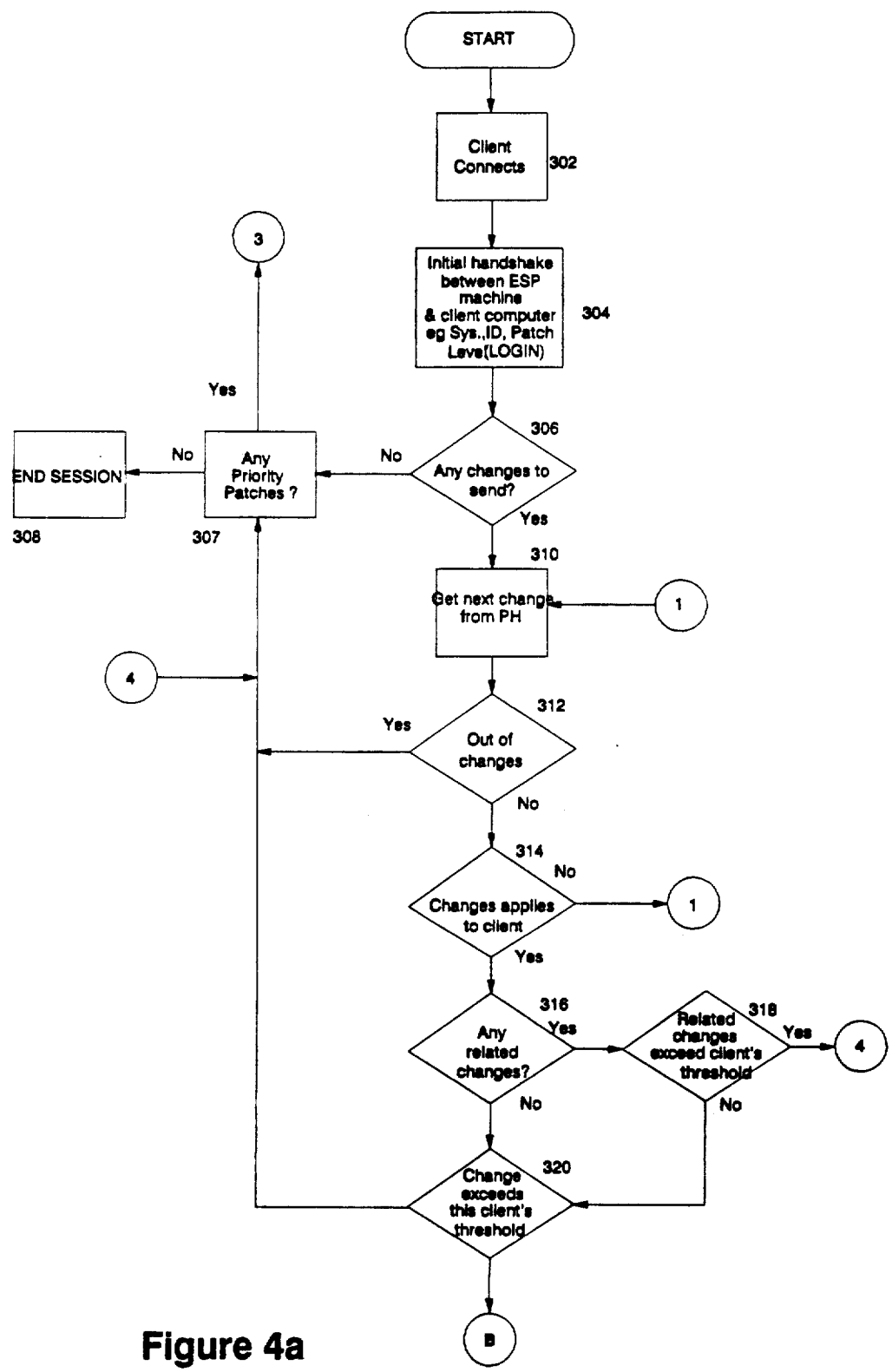
FIG. 4a is a portion of a flow chart illustrating the operation of the portion illustrated in FIG. 2b.
Figure 4B:
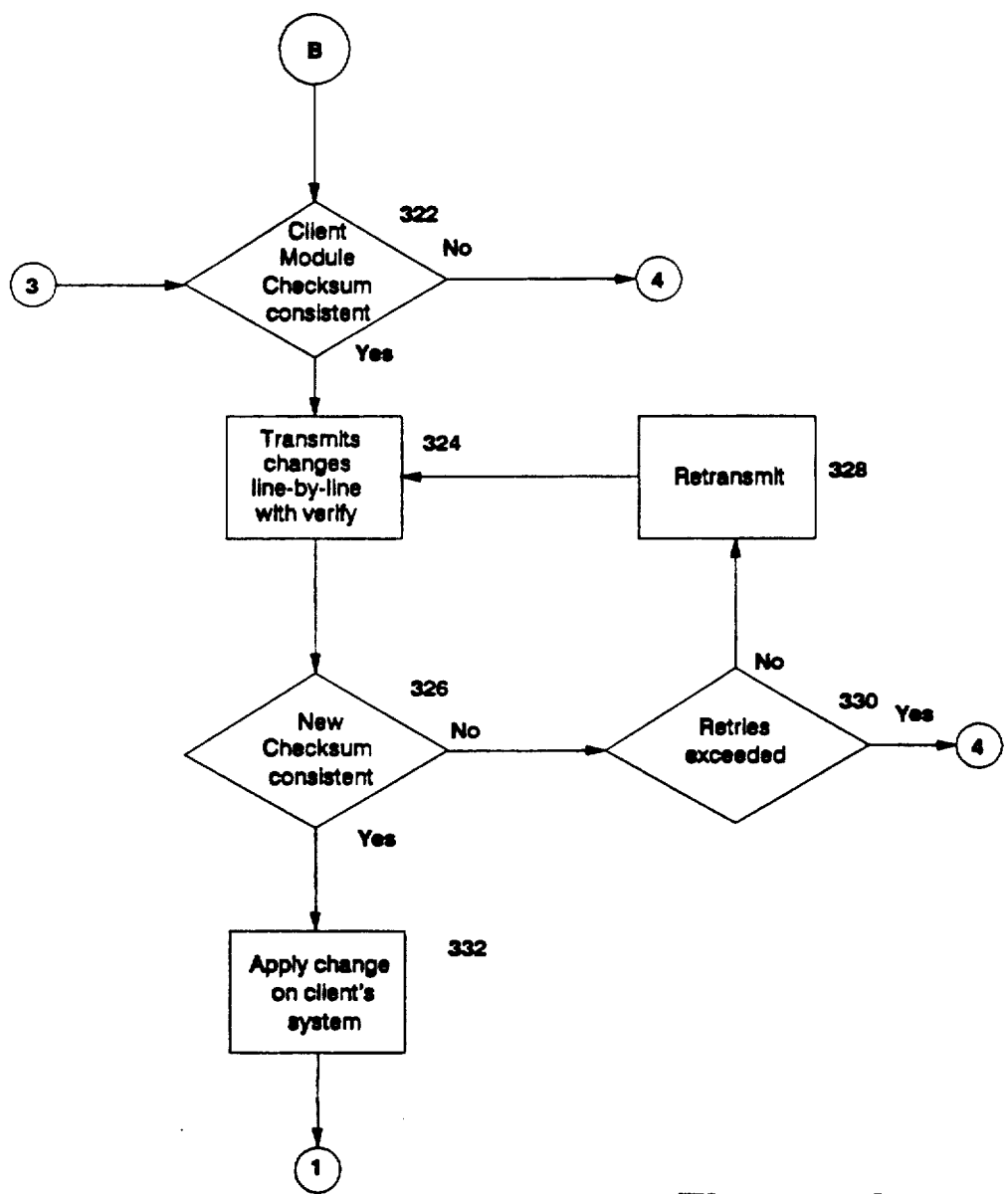
FIG. 4b is another portion of a flow chart illustrating the operation of the portion illustrated in FIG. 2b.

Referring to FIGS. 4a and 4b the operation of the system patcher 34 will now be described. When a remote computer system 12 attempts to access the central computer system 14, the remote computer system must first establish a communication path over the packet switching network 16. When access has been requested and detected by detection function 60 as indicated at block 302, the requesting remote system 12 is usually permitted access to the central system. Since the central computer system 14 includes multi-tasking software, the system 14 is capable of establishing a communication link with more than one remote system at a time via a number of inputs, in this case 16 although the number of inputs can be increased or decreased depending on the number of remote systems 12 in the system 10. Typically, thirteen of the sixteen input lines are used to establish communication links with remote systems 12 and the other three input lines are reserved to establish communication links between the central system 14 and remote systems 12 assigned access priority when the thirteen input lines are all occupied.

It should be realized that the total number of input lines and the number of reserved input lines be increased or decreased depending on the needs of the system 10.

Since the remote systems are able to gain access to the central system at any time, the available input lines are not usually all occupied when a remote computer system 12 is attempting to gain access to the central system. If a remote system 12 attempts to gain access to the central system and the input lines to the system are all occupied, the remote system will receive a message indicating that the central system 14 cannot establish a communication link at that time and that the remote system should attempt to gain access to the central system at a later time if it has not been assigned access priority. However, if the remote system 12 has been assigned access priority, the function 60 will detect this and allow the remote system 12 to establish a communication link via one of the three input lines.

The set-up section 62 requests the remote computer system to supply the appropriate identification codes. When the proper identification codes have been received, the remote computer system 12 is permitted to access the central computer system 14 as indicated at block 304. Following this, the detection function 64 requests the remote system 12 to supply the type of software including all optional programs and the version number of the programs that it uses, along with the patch number of the last patch that was successfully received for comparison with the patch number stored in the client data base associated with the remote computer system gaining access to the central system 14.

When this information has been received by the detection and examination function 64, it is compared with the information stored in the client data base of the validation function 65 to ensure that the transmitted information is the same as the information stored in the client data base. If the patch number and other information transmitted by the remote computer system 12 does not confer with the data stored in the validation function 65, the remote computer system 12 is informed that its software has been corrupted and the session is terminated. When this occurs the central computer system 14 is notified so that the remote computer system 12 can be forwarded uncorrupted software via tape distribution.

If the transmitted information corresponds with that stored in the client data base, the transmitted data is conveyed to the processor function 40 in the program history section 32. The processor function 40 in turn examines the version number, the programs used by the remote computer system 12 and the patch number received from the remote computer system 12 to detect whether any further patches have been made to the corresponding programs stored in the data store 28 that are used by the remote computer system 12 as indicated at block 306.

If the patch number transmitted by the remote computer system 12 is equal to or greater than the patch threshold value assigned to the corresponding group, the central system examines the client data base to determine firstly whether the remote system 12 has been assigned any priority patches and secondly whether the group that the remote system 12 is located has been assigned any priority patches as indicated at block 307. If the remote system 12 and the group to which it belongs have not been assigned any priority patches, the remote computer system 12 is informed that it has the most up-to date changes made to all of the programs stored therein. After this, the session is terminated and the communication link is disconnected as indicated at block 308.

However, if the remote system 12 has been assigned a priority patch having a patch number greater than the threshold value, the priority patch is transmitted to the remote system along with any related patches and any other patches made to the same program having patch numbers less than the priority patch that the remote system has not yet received in a manner to be described. It should be realized that all nested related patches will be individually transmitted to the remote system regardless of the patch number of the related patches.

Once this has been performed or if the remote system has not been assigned any priority patches, the client data base is examined to detect whether the group to which the remote system belongs has been assigned any priority patches. If the group has not been assigned any priority patches or if the number of the priority patch assigned to the group is less than the number of the priority patch assigned to the remote system, the session is terminated since the remote system has the most up-to-date changes that it can receive as indicated at block 308.

If, however, the remote system 12 has not been assigned any priority patches but the group to which the remote system belongs has been assigned a priority patch or if the group has been assigned a priority patch having a patch number greater than the patch number of the priority patch assigned to the remote system 12, a similar process as previously described with respect to priority patches assigned to a specific remote system 12 is performed.

If the patch number received from the remote computer system 12 is less than the threshold value assigned to the group to which the remote system 12 belongs, the patch numbers in the data store 28 are examined to detect the patches that have been made to the same corresponding programs used by the remote computer systems 12 that the remote computer system has not yet received.

Before individual transmission of each of the detected patches occurs, the patches are examined individually to detect whether each patch is related to another patch or if a patch is related to an optional program that is not used by the remote computer system 12 as indicated at block 314. If any patch is detected as being related to another patch as indicated at block 316, the patch number or numbers of the related patch or patches to be transmitted are compared with the group threshold value stored in the client data base to detect whether the patch number or numbers of the related patches are above the patch threshold value as indicated at block 318.

If the patch numbers of the related patches exceed the patch threshold value, then the patch is not sent to the remote system 12. The client data base is then examined to detect whether the remote system 12 has been assigned any priority patches in the same manner as previously described. If the remote system has not been assigned any priority patches or if the priority patch number is less than the patch threshold value, the session between the remote computer system 12 and the central computer system 14 is terminated as indicated at block 308, since the remote computer system 12 has the most up-to-date changes of the programs that it is capable of receiving at that time.

If the remote system 12 or the group to which the remote system 12 belongs have been assigned priority patches then, the appropriate patches are transmitted individually to the remote system 12 as will be described.

If the patch to be transmitted has a related patch or patches with patch numbers which do not exceed the patch threshold value, then the patch number of the patch is examined to determine whether it is below the threshold value as indicated at block 320. If the patch number of the patch is less than or equal to the threshold value, then the patches and the related patches are individually transmitted to the remote system as will be described.

If, however, the patch number of a patch is greater then the threshold value, the patch is not transmitted. The client data base is then examined to detect whether any priority patches have been assigned to the remote system and the appropriate processes are performed as previously described.

The processes indicated by blocks 310 to 320 are repeated until the patch to be transmitted has a patch number greater than the threshold value or until a related patch is detected having a patch number greater than the threshold value.

In either of the above mentioned cases concerning related patches, if a patch to be transmitted is related to another program that the remote system 12 does not use, the relationship is ignored and the process continues. This ensures that all upgrades made to a program used by the remote system are received. Furthermore, this allows remote systems receiving the related optional programs at a later time to operate using their current programs without requiring upgrading of the current programs.

Similarly, if no related patches are detected, the patches having patch numbers less than the threshold value and any priority patches assigned to the remote system or its group are also transmitted to the remote system.

Once a patch to be transmitted to the remote system is determined, the central computer system examines the checksums of the last patch received by the remote system stored in the client data base and compares these checksums with the checksums in the data store 28 to ensure that the values are consistent as indicated at block 322. If the checksums are not consistent, the session between the remote computer system and the central computer system 14 is terminated as indicated at block 308.

However, if the checksums are consistent, the patches are transmitted to the remote computer system 12 one at a time as indicated at block 324. When a patch is received by the remote computer system 12, a copy of the program is made in the remote computer system and the patch is applied to the copied program. Checksums are calculated for the copied program and compared with the checksums assigned to the patch in the central system via the verification function to detect whether they are the same thereby verifying correct transmission of the patch as indicated at block 326. If the checksums do not match, the patch is retransmitted until it is properly received or until a predetermined number of tries have been exceeded in which case the session is terminated as indicated at blocks 328 and 330. If the checksums match, the copied program with the patch applied thereto is used to replace the original program in the remote computer system 12 as indicated at block 332. This process is performed for each patch stored in the data store 28 that is to be transmitted until the remote computer system has received the most up-to-date changes of that software that is available.

The group distribution numbers assigned to the groups is used as mentioned previously to permit staged release of the software upgrades. The distribution number simply puts a time delay on the increment of the patch threshold value for the various group of remote systems thereby adding flexibility by making the upgrades available to the various groups of systems 12 at different times.

Although the present system has been described as using packet switching networks as communication links, it should be realized that various other types of communication links can be used.

The present system provides a number of advantages in that each incremental change made to a version of a program is available to the remote users. In this manner, a client who purchases one version of the software can get support and upgrades for that version without having to purchase the next version which would otherwise include some or all of the upgrades. The system allows all users of the software to receive upgrades with a minimum of delay since all that is required is a simple telephone call to link the remote computers to the central computer. Furthermore, since the multi-tasking capabilities are used, access is facilitated since the central computer can accommodate a large number of remote computers which attempt to access the central computer at relatively the same time.

We claim:

1. A method of upgrading, from a central computer system, the executable code used in at least one remote computer system, comprising the steps of:

storing in said central computer system a record of the executable code in use at said at least one remote computer system and executable code corresponding to the executable code used in said at least one remote computer system;

upgrading the corresponding executable code and recording the changes made to said corresponding executable code at said central computer system, wherein said changes are in the form of patches, each patch including at least one change to said corresponding executable code;

assigning first and second checksums to each said patch, said first checksum representing an image of the corresponding executable code before the patch is applied thereto and said second checksum representing an image of the corresponding executable code after the patch has been applied thereto;

establishing a communications link between said at least one remote computer system and said central computer system, said central computer system identifying said at least one remote computer system and examining said record to determine the executable code used therein;

examining said record to determine the changes that have been made to said corresponding executable code that have not been made to the executable code used at said at least one remote computer system;

transmitting the changes made to said corresponding executable code to said at least one remote computer system to upgrade the executable code therein; and verifying transmission of the changes and examining the upgraded executable code used at said at least one remote computer system to ensure that the executable code used therein has been properly upgraded.

2. A method as defined in claim 1 further comprising the step of assigning a patch number to each of said patches, said patch number indicating the total number of patches made to the corresponding executable code stored at said central computer system.

3. A method as defined in claim 2 including a plurality of remote computer systems wherein each remote computer system is assigned a threshold value, said threshold value capable of being different for each remote computer system, the threshold value being used to allow remote computer systems to receive patches having patch numbers less than or equal to said threshold value.

4. A method as defined in claim 3 further comprising the steps of testing said patches at said central computer system prior to making said patches available for release to said plurality of remote computer systems, said patches being tested in numerical order as determined by said patch number, said threshold values assigned to said plurality of remote computer systems being determined by the numbers assigned to said patches.

5. A method as defined in claim 4 wherein said patches can be tested out of numerical order, said threshold values being equal to a number less than or equal to the highest patch number assigned to a patch that has been tested and wherein all patches having a patch number less than the highest patch number have also been tested.

6. A method as defined in claim 5 further comprising the step of allowing said central computer system to transmit priority patches to said remote computer systems having patch numbers exceeding said threshold value, said central computer system transmitting said priority patches, any patches related to the priority patches and any patches made to the corresponding executable code at said central computer system having patch numbers of a value between the threshold value and the priority patch number.

7. A method as defined in claim 1 further comprising the steps of examining each patch made to the corresponding executable code stored at the central computer system to determine if a patch is related to a previous patch made to said corresponding executable code and coding the related patches to ensure that said at least one remote computer system being upgraded receives all related patches when the executable code therein is being upgraded.

8. A method as defined in claim 7 wherein the patches made to the corresponding executable code are manually coded as being related to previous patches.

9. A method as defined in claim 1 wherein there are at least two remote computer systems, each of said remote computer systems have a mandatory set of executable code, each of said remote computer systems being capable of having a different version of said mandatory set of executable code and wherein at least one of said remote computer systems is supplied with at least one additional set of executable code which co-operates with said mandatory set of executable code being of the same version in said at least one remote computer system, said mandatory and additional sets of executable code constituting said corresponding executable code and being upgraded at said central computer system.

10. A method as defined in claim 9 further comprising the steps of:
 determining at said central computer system the mandatory and additional sets of executable code used at said at least one remote computer system and the version thereof once a communication link has been established and said at least one remote computer system has been identified and prior to transmitting said patches; and
 transmitting automatically said patches from said central computer system to said remote computer system relating to said mandatory and additional sets of executable code used at said one remote computer system.

11. A method as defined in claim 1 further comprising the steps of:
 examining each patch made to the corresponding executable code stored at said central computer system to detect whether said patch is applicable to other versions of the same executable code and
 applying the patch to the other versions of the same executable code stored at said central computer when said patch is detected as being applicable thereto.

12. A method as defined in claim 11 wherein said other versions of the same executable code are detected automatically by said central computer system, said method further comprising the step of the said central computer system applying said patches to the other versions of the same executable code stored at said central computer automatically upon an input confirmation.

13. A method as defined in claim 1 further comprising the steps of:
 comparing automatically at said central computer system the first checksum assigned to a patch to be applied to said corresponding executable code with the second checksum assigned to the previous patch made to the corresponding executable code to ensure that the checksums are identical; and
 recording the patches at said central computer system when said checksum are identical.

14. A method as defined in claim 13 wherein said central computer system stores a first version of executable code and at least one different of the same executable code, said at least one different version being used in said remote computer systems, and wherein a patch made to said first version can be applied to said at least one different version, further comprising the steps of:
 comparing automatically at said central computer system the first checksum assigned to said patch with the second checksum of the last patch applied to said at least one different version;
 applying said patch to said at least one different version when said first and second checksums correspond;
 making a copy of said at least one different version and applying said patch to said copy, when said checksums do not correspond;
 determining a first set of differences between said copy and a patched first version;
 determining a second set of differences between the unpatched first version and said at least one different version; and
 applying the patch to said at least one different version when said first and second sets of differences are equivalent.

15. A method as defined in claim 1 wherein the step of verifying transmission of said patches further comprises the step of transmitting said first and second checksums to said remote computer system, said remote computer system examining the checksums assigned to said patches to determine if the transmission of the patches is correct.

16. A method as defined in claim 15 wherein the step of verifying transmission of said patches further comprises the steps of making a copy at said at least one remote computer system of the executable code used at said at least one remote computer system and applying the transmitted patch thereto;
 said remote computer assigning a checksum to the copy of the executable code with the patch applied thereto and comparing said checksum to said transmitted second checksum; and
 replacing the executable code with the copy of the executable code having the patch applied thereto when said assigned and said transmitted second checksum are equivalent.

17. A method as defined in claim 1 wherein there are a plurality of said remote computer systems and further comprising the step of allowing two or more of said plurality of remote computer systems to gain access to said central computer system at the same time.

18. A method as defined in claim 17 further comprising the steps of assigning at least one of said plurality of remote computer system with access priority;
 providing said central computer system with a predetermined number of reserved communication inputs;
 inhibiting remote computer systems without priority access from establishing a communication link via said reserved inputs; and
 allowing said at least one of said plurality of remote computer systems assigned access priority to establish a communication link with said central computer system via one of said reserved inputs when the other inputs to said central computer system are occupied.

19. A method as defined in claim 1 further comprising the step of releasing said patches to different remote computer systems at different times.

20. A method as defined in claim 19 wherein the times at which said patches are released to said at least one remote computer system are based on a predetermined logical grouping of said remote computer systems.

21. A system for upgrading, from a central computer system, the executable code used in at least one remote computer system comprising:
   storage means located in said central computer system for storing a record of the executable code in use at said at least one remote computer system and executable code corresponding to the executable code used in said at least one remote computer system;
   input means located at said central computer system for allowing the corresponding executable code stored therein to be upgraded;
   upgrade detection means located in said central computer system for detecting and recording automatically each change made to the corresponding executable code stored therein, wherein said changes are in the form of patches with each patch including at least one change to said corresponding executable code;
   checksum assignor means in said central computer system and said at least one remote computer system for assigning each patch a pair of checksums, said checksums representing an image of the corresponding executable code with and without the patch applied thereto;
   communication means for establishing a communication link between said at least one remote computer system and the central computer system;
   first identifying means located in said central computer system to identify said at least one remote computer system and to examine said record to determine the executable code used therein;
   second identifying means for examining said record to identify the changes that have been made to the corresponding executable code stored in said central computer system which have not been made tot he executable code in said at least one remote computer system;
   transmission means for transmitting the identified changes from said central computer system to said at least one remote computer system; and
   verification means at one of said central computer system and said at least one remote computer system for comparing the checksums assigned to said patch by said central computer system with those assigned by said at least one remote computer system thereby to ensure that each patch is received at said at least one computer system correctly.

22. A system as defined in claim 21 wherein the input means includes at least one computer terminal.

23. A system as defined in claim 21 wherein said communication link is in the form of a packet switching network, said transmission means transmitting said patches from the central computer system to said at least one remote computer system over said packet switching network.

24. A system as defined in claim 21 wherein there are a plurality of remote computer systems and said central computer system includes multi-tasking capabilities and a plurality of inputs to allow at least two of said plurality of remote computer systems to gain access to the central computer system at the same time.

25. A system as defined in claim 2 wherein at least one remote computer system is given access priority to said central computer system, said central computer system further including at least one predetermined input reserved to allow said at least one remote computer system assigned access priority to establish a communication link via said at least one predetermined input when the other inputs to said central computer system are occupied.

26. A system as defined in claim 21 wherein said central computer system assigns a patch number to each patch made to said corresponding executable code said patch number increasing consecutively with each patch made.

27. A system as defined in claim 26 further comprising a related patch detector in said central computer system for detecting and coding patches which are related to previous patches made to the corresponding executable code to ensure that said at least one remote computer system receives all related patches when the executable code used therein is being upgraded.

28. A system as defined in claim 27 further comprising a plurality of remote computer systems and threshold assigning means at said central computer system for assigning a threshold value to each of said plurality of remote computer systems, said threshold value capable of being different for each of said plurality of remote computer systems, said threshold value being used to allow each of said plurality of remote computer systems to receive patches having patch numbers and related patch numbers less than or equal to said threshold value.

29. A system as defined in claim 28 wherein said central computer system tests said patches before making them available for release to said remote computer systems, said threshold values being equal to a number less than or equal to the highest number assigned to a patch tested by said central computer system and wherein all patches having a number below said highest number have also been tested.

30. A system as defined in claim 29 further comprising means for allowing patches having a number greater than said threshold value to be transmitted to predetermined ones of said remote computer systems.

31. A system as defined in claim 21 wherein said central computer system releases patches to different remote computer systems at different times.

32. A system as defined in claim 31 wherein the times at which said patches are released to said at least one remote computer system are based on a predetermined logical grouping of said remote computer systems.

* * * * *